Figure 2:
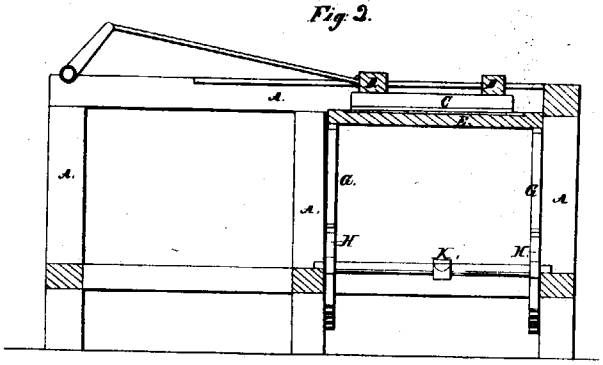
Figure 3:
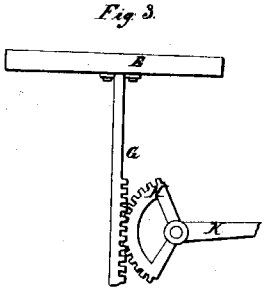
Figure 4:
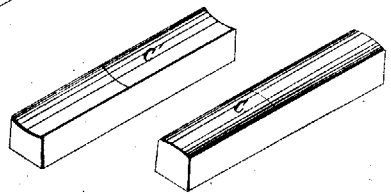
Figure 1:
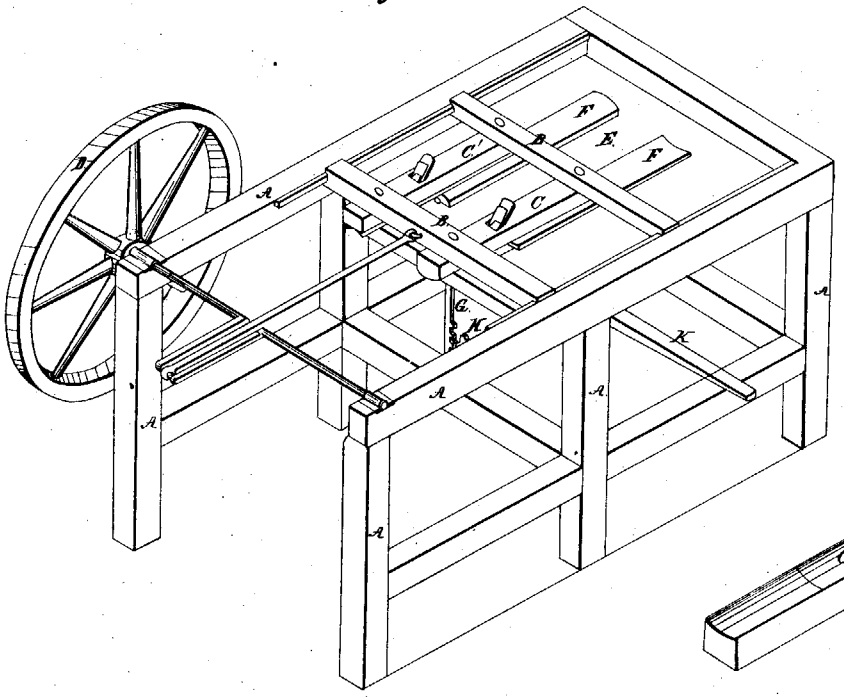

8533X

A. Fairchild,

Dressing Stares,

Patented Dec. 17, 1834.

AM. PHOTO-LITHO. CO. N.Y. (OSBORNE'S PROCESS)

8533X Dec 17. 1834

Asahel Fairchild of Greensbury New York

Letters Patent.

The Schedule referred to in these Letters Patent and making part of the same containing a description in the words of the said Asahel Fairchild himself of his Improvement in a machine for Dressing Staves.

To all to whom these presents shall come. Be it known that I Asahel Fairchild of Greensbury, in the County of Warren and State of New York, have invented a new and useful improvement in a machine for dressing Staves, and that the following is a full and exact description of the construction and operation of the said machine as invented or improved by me.

This improvement consists in the application of hollowing and rounding planes to the shaping of Staves. The curvature of the Planes corresponding with the size of the cask for which the staves are intended. For this purpose two planes, one a hollowing and one a rounding one are fitted into a frame, side by side, so that they may slide backwards and forwards in a horizontal position, a distance somewhat greater than the length of the stave. The Planes are moved by means of a Pitman of suitable length attached to them at one end, and at the other to a heavy balance wheel, whose rotation gives an alternate motion to the pitman, and consequently to the Planes to which it is attached. In some situations it is more convenient to attach the Pitman to a sliding frame from [illegible] [illegible] to eighteen inches below the level of the planes. To this frame are fixed two upright pieces which are connected to the planes by means of two horizontal coupling rods. This sliding frame is constructed after the manner of a Saw Gate in a common Saw Mill, except that its movements are horizontal. Two Planes (as mentioned above) will probably be found most convenient, but a greater or less number may be used in a sinilar manner. Below the Planes is a bench which can be ele-
vated or depressed with the foot, at pleasure, by means of a tread-
le connected with a rack and pinion, belt and pulley or any
other suitable apparatus. In this bench are two cavities or
beds, made immediately under the Planes, for the reception of
the staves which serve to keep them steady and to regulate their
thickness. To operate with this machine, any sufficient pow-
er is applied to the Balance Wheel, whose rotation moves the planes
The staves to be shaped are placed in the beds on the bench, which
is raised by the foot high enough for the Planes to operate on the
on the Staves. After one side of a stave is shaped, it must
be removed to the other plane to be finished.

What I claim is the application of hollowing and rounding
Planes, when moved by power other than the hand, to the shaping
or dressing of Staves.

Asahel Fairchild

Exd. Witnesses
W.G.H. William H Scott
Francis Collins

Drawing

529.